US000001130H

United States Statutory Invention Registration [19]

[11] Reg. Number: H1130

Place et al. [43] Published: Jan. 5, 1993

[54] TOOL AND METHOD FOR BLOUSING A PROPELLANT CONTAINMENT BAG IN CARTRIDGE AMMUNITION

[75] Inventors: Edward A. Place, Danville; Jack R. Polson, West Burlington; Louis Stoecker, Burlington, all of Iowa

[73] Assignee: The United States of America as represented by the Secretary of the Army, Washington, D.C.

[21] Appl. No.: 886,561

[22] Filed: May 18, 1992

[51] Int. Cl.[5] ..... F42B 33/00
[52] U.S. Cl. ..... 86/24; 15/104.18
[58] Field of Search ..... 86/21, 28, 33, 24, 1.1; 15/104.18

*Primary Examiner*—Brian S. Steinberger
*Attorney, Agent, or Firm*—Michael C. Sachs

[57] ABSTRACT

A tool and corresponding method for removing folds and buckles in the material of a propellant containment bag, in a round of ammunition, prior to the addition of explosive propellant. The tool includes a plurality of flexible fingers that are inserted into the propellant containment bag through the primer cap aperture. Once inside, the flexible fingers are expanded, pressing the propellant containment bag against the inside of the cartridge case. The tool is advanced to the far end of the propellant containment bag, thereby pulling taut the entire bag. The flexible fingers extend around the tail end of the projectile of the ammunition round, removing folds in the propellant containment bag that may interfere with the dispersion of propellant around the stabilizer fins or other features of the projectile's tail end, when propellant is subsequently added.

20 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

10
12
14
16
18
20
22
24
74
9
42

TOOL AND METHOD FOR BLOUSING A PROPELLANT CONTAINMENT BAG IN CARTRIDGE AMMUNITION

GOVERNMENT INTEREST

The invention described herein may be made, used or licensed by or for the Government for governmental purposes without the payment to me of any royalties thereon.

FIELD OF THE INVENTION

The present invention relates to a hand tool and method for expanding the propellant containment bag within a kinetic energy projectile cartridge, prior to the introduction of propellant, and more particularly to such tools and methods that eliminate folds and seams in the propellant bag that prevent the proper positioning of propellant around the tail of a projectile.

BACKGROUND OF THE INVENTION

Weaponry that fires cartridge contained ammunition is commonplace and varies in size applications from pistols to artillery cannons. Despite the size, the function of cartridge ammunition is essentially the same. Cartridge ammunition includes a cartridge case filled with an explosive propellant and the projectile that is to be fired. The cartridge is loaded into the firing chamber of a gun or cannon, the propellant is ignited and the projectile fired through a barrel. The empty cartridge case is then ejected.

In modern weaponry, certain guns and cannons fire highly complex cartridges that include sophisticated explosive propellants and projectiles. In certain applications, the cartridge case used in the fabrication of the cartridge is not metal; rather, the cartridge case is formed from a light weight, nitro-cellulose material. The use of a light weight material instead of metal for the cartridge case reduces the overall weight and cost of the cartridge and reduces the effort needed to handle spent cartridge cases. An unfortunate disadvantage of non-metal cartridge cases is that they are more likely to rupture prior to use. Obviously, since cartridge cases encapsulate the explosive propellant, a rupture in this encasement, and the resulting escape of explosive propellant, is highly dangerous.

To prevent the danger of explosive propellant escaping from ruptured cartridges, some cartridges include a propellant containment bag within the cartridge case. The propellant containment bag surrounds the explosive propellant holding it in place, despite the presence of a rupture in the cartridge case. In some large caliber applications such as 120 mm cartridges, the tail end of the projectile extends into the explosive propellant within the cartridge. Since the explosive propellant is surrounded by the propellant containment bag, the containment bag also surrounds the portion of the tail end of the projectile that extends into the propellant. Certain projectiles have stabilizer fins formed as part of their tail ends. The stabilizer fins help in the aerodynamics of the projectile when in flight. Often it is the stabilizer fin portion of the projectile that extends into the propellant containment bag and is surrounde by propellant.

In manufacturing large caliber cartridges that include finned projectiles and a propellant containment bag, the projectile and containment bag are positioned within the cartridge case prior to the addition of explosive propellant. Since the propellant containment bag is made from a fabric, it often folds and buckles under its own weight within the cartridge case. Commonly, the propellant containment bag folds near the stabilizer fins of the projectile covering various portions of the stabilizer fins. When explosive propellant is introduced into the propellant containment bag, the folds in the fabric of the containment bag prevent the even distribution of explosive around the stabilizer fins of the projectile. The containment bag therefore prevents a full load of explosive propellant from being added to the containment bag or produces an uneven propellant distribution which may affect the flight of the projectile.

It is therefore a primary objective of the present invention to provide a tool that can enter the propellant containment bag, prior to the insertion of explosive propellant, to remove any folds or buckles that may have occurred in the propellant containment bag that could adversely affect the distribution of explosive propellant when added.

It is therefore another primary objective of the present invention to set forth a method for removing folds or buckles in propellant containment bags, prior to the addition of explosive propellant.

SUMMARY OF THE INVENTION

The present invention provides a tool and corresponding method for eliminating folds and buckles in the material of a propellant containment bag, within a round of ammunition, prior to the addition of explosive propellant to the round. More specifically, the present invention includes a tool that is partially inserted into the propellant containment bag of a round of ammunition through the primer cap aperture. The tool has a plurality of flexible fingers that can be expanded from the tool inside the propellant containment bag. The flexible fingers expand and press the material of the propellant containment bag against the inside surface of the cartridge case of the round. The tool is advanced with the flexible fingers extended; the resulting tension caused by the flexible fingers pulls the material of the propellant containment bag taut, eliminating unwanted folds or buckles.

Each flexible finger of the present invention tool is formed from a plurality of spring wires joined at one end by an enlarged blunt point. The plurality of spring wires ensures that if a spring wire were to fatigue and break, it would not remain in the propellant containment bag where it could cause the ammunition round to misfire. Additionally, the enlarged blunt points of the flexible fingers prevent the flexible fingers from tearing the material of the propellant containment bag or damaging the projectile by accidentally piercing and igniting the projectile tracer.

The flexible fingers are shaped to extend around the tail end of the projectile. As such, the flexible fingers remove folds and buckles in the material of the propellant containment bag around any stabilizer fins or other features of the projectile tail end. After its use, the flexible fingers are retracted back into the tool by advancing a tubular sheath over the fingers. Once retracted, the tool can be removed through the primer cap aperture and the propellant can be properly added into the propellant containment bag.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention containment bag blousing tool can be used in the process of fabricating many different size cartridges, it is especially suitable for use in producing 120 mm ammunition. Accordingly, the use of the present invention containment bag tool will be described in connection with the fabrication of a 120 mm round of ammunition.

Figures 1, 2:
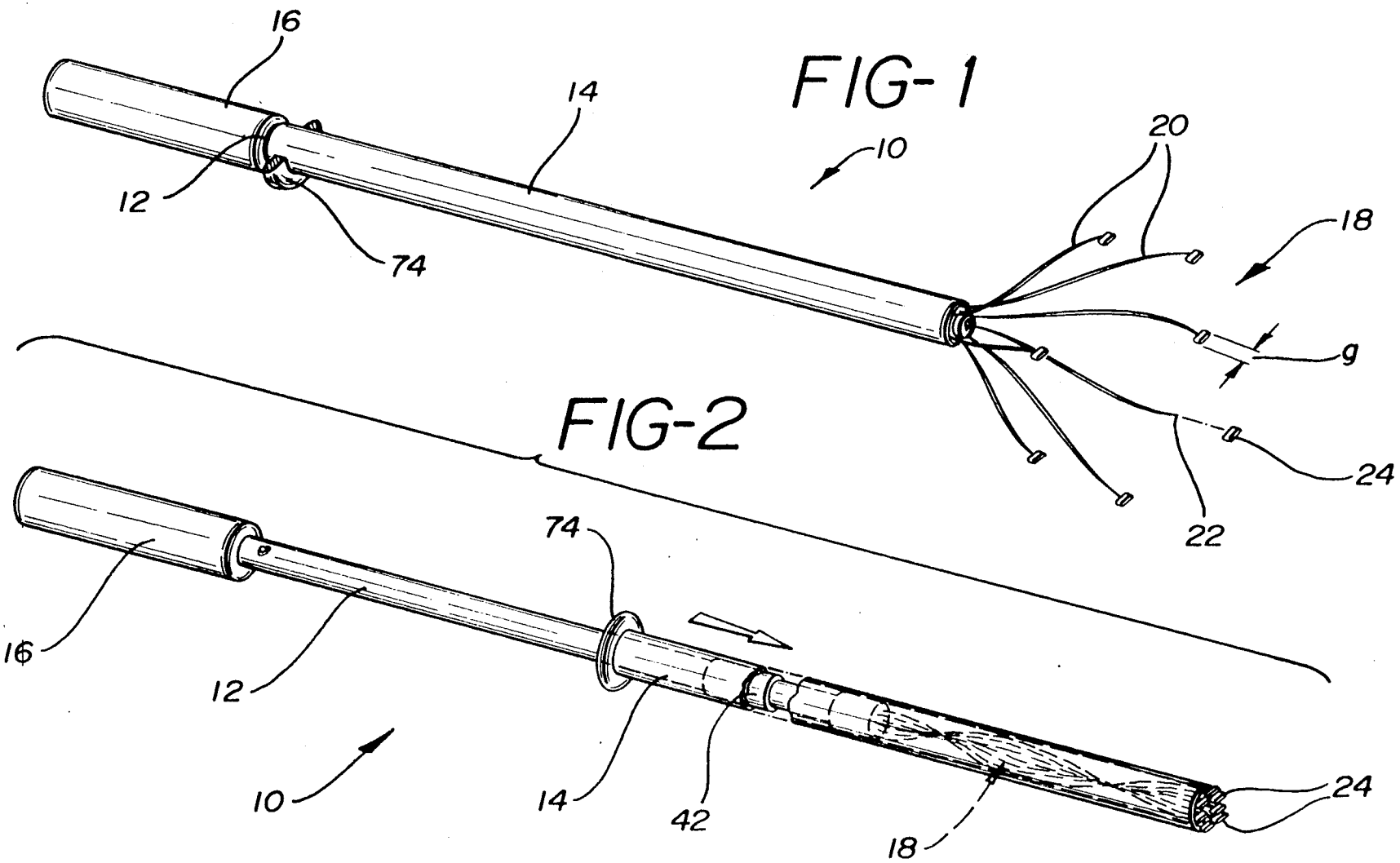
FIG. 1 is a perspective view of one exemplary embodiment of the present invention containment bag blousing tool, the tool being shown in its fully extended position and being partially fragmented to facilitate consideration and discussion.
FIG. 2 is a perspective view of the present invention containment bag blousing tool of FIG. 1 shown in its fully retracted position and being partially fragmented to facilitate consideration and discussion.
Figure 3:
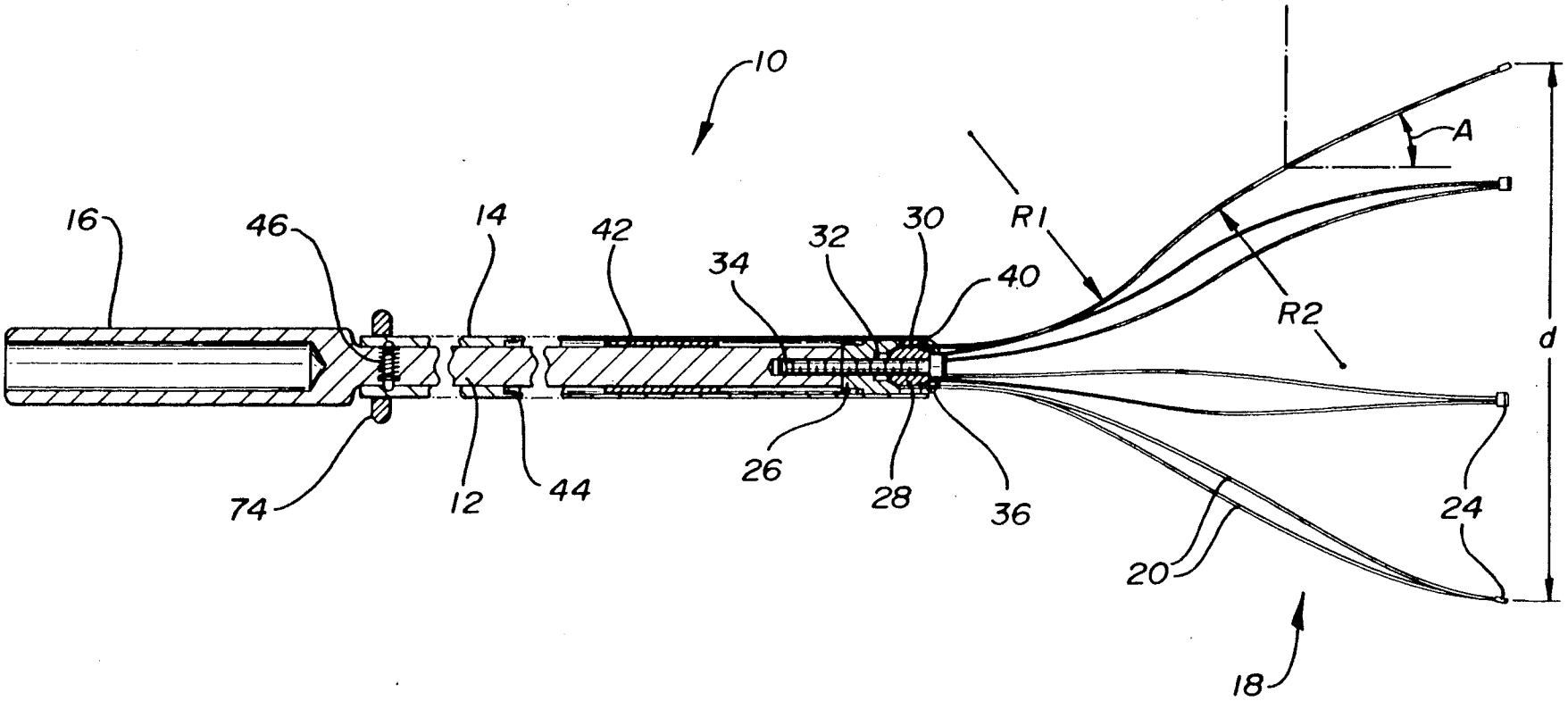
FIG. 3 is a cross-section view of the present invention containment bag blousing tool as depicted in FIG. 1 cut along section line 3—3.

Referring to FIGS. 1-3, the present invention containment bag blousing tool 10 is shown comprising an elongated shaft 12 positioned within the lumen of a tubular sheath 14. The elongated shaft 12 terminates at one end in a handle 16 that is enlarged so as not to be able to pass the tubular sheath 14. The end of the shaft 12, opposite the handle 16, terminates in a plurality of flexible fingers 18. The flexible fingers 18 are spring biased so as to diverge away from the longitudinal axis of the shaft 12.

Each flexible finger 18 is formed from a plurality of spring wires 20 that converge at the tip 22 of each flexible finger 18. The tip 22 of each flexible finger 18 is covered in a blunt stop 24 having a predetermined width w. The flexible fingers 18 are annularly disposed, symmetrically diverging away from the longitudinal axis of the shaft 12 to a maximum diameter d. Each flexible finger lB follows a complex curve having a predetermined first and second major radius of curvature R1, R2, giving each flexible finger 18 a loosely S-shaped profile. The length of the flexible finger 18 between the blunt stop 24 and the second radius of curvature R2, is straight and is directed to be at angle A with the longitudinal axis of the shaft 12, which is preferably about 25 degrees.

The spring wires 20 forming the flexible fingers 18 are attached to the shaft 12 by being compressed between a base locking member 26 and a cap locking member 28. The cap locking member 28 has a plurality of apertures 30 formed through it through which the base end 32 of each spring wire 20 passes. The cap locking member 28 and the base locking member 26 have a central orifice through which a mechanical fastener 34, such as a threaded bolt, passes. The mechanical fastener 34 attaches to the shaft 12 through the cap locking member 28 and the base locking member 26, compressing the spring wires 20 between the cap locking member 28 and the base locking member 26. Optionally, a rubber material 36 could be placed atop the cap locking member 28 to help prevent the loosening of the mechanical fastener 34 during use.

The spring wires 20 are mechanically fastened to the shaft 12 to avoid the thermal stress that occurs during welding. The thermal stresses of welding may remove the annealing of the spring wire 20, thus causing the spring wires 20 to loose part of their spring bias. Welding of the spring wires 20 may also cause brittle areas that could fracture when subjected to repeated fatigue stresses during use. Mechanically fastening the spring wires 20 to the shaft 12 also permits damaged spring wires 20 to be quickly replaced without additional welding or the disposal of the tool 10.

The shaft 12 is axially and reciprocally movable within the tubular sheath 14. The movement of the shaft 12 is controlled manually through the reciprocal manipulation of the handle 16. As the handle 16 is pulled away from the tubular sheath 14, the flexible fingers 18 are drawn into the sheath 14. The edge 40 of the sheath 14 contacts each spring wire 20 as the shaft 12 is retracted. The contact of the spring wires 20 against the sheath edge 40 deforms the spring wires 20, causing the spring wires 20 to conform to the inner diameter of the sheath 14. The retraction of the piston 12 can be continued until the length of the spring wires 20 has been retractdd into the sheath 14.

A stop member 42 is positioned on the shaft 12 within the sheath 14. The stop member 42 is so positioned so as to contact an abutment 44 within the sheath 14, stopping the retraction of the shaft 12 within the sheath 14. The contact of the stop member 42 against the abutment 44 prevents the shaft 12 and the flexible fingers 18 from being removed from the sheath 14 by over retracting the shaft 12. The shaft 12 is prevented from being removed from the sheath 14 in the opposite direction by the presence of the handle 14 which cannot pass through the sheath 14.

Since the shaft 12 is axially and reciprocally movable within the sheath 14, a snap lock 46 is positioned on the shaft 12 that temporarily locks the shaft 12 and the sheath 14 together when the flexible fingers 18 are fully extended. The snap lock 46 allows a user of the blousing tool 10 to manipulate it with one hand without the relative position of the shaft 12 and the sheath 14 being altered by forces encountered during use.

Figure 4:
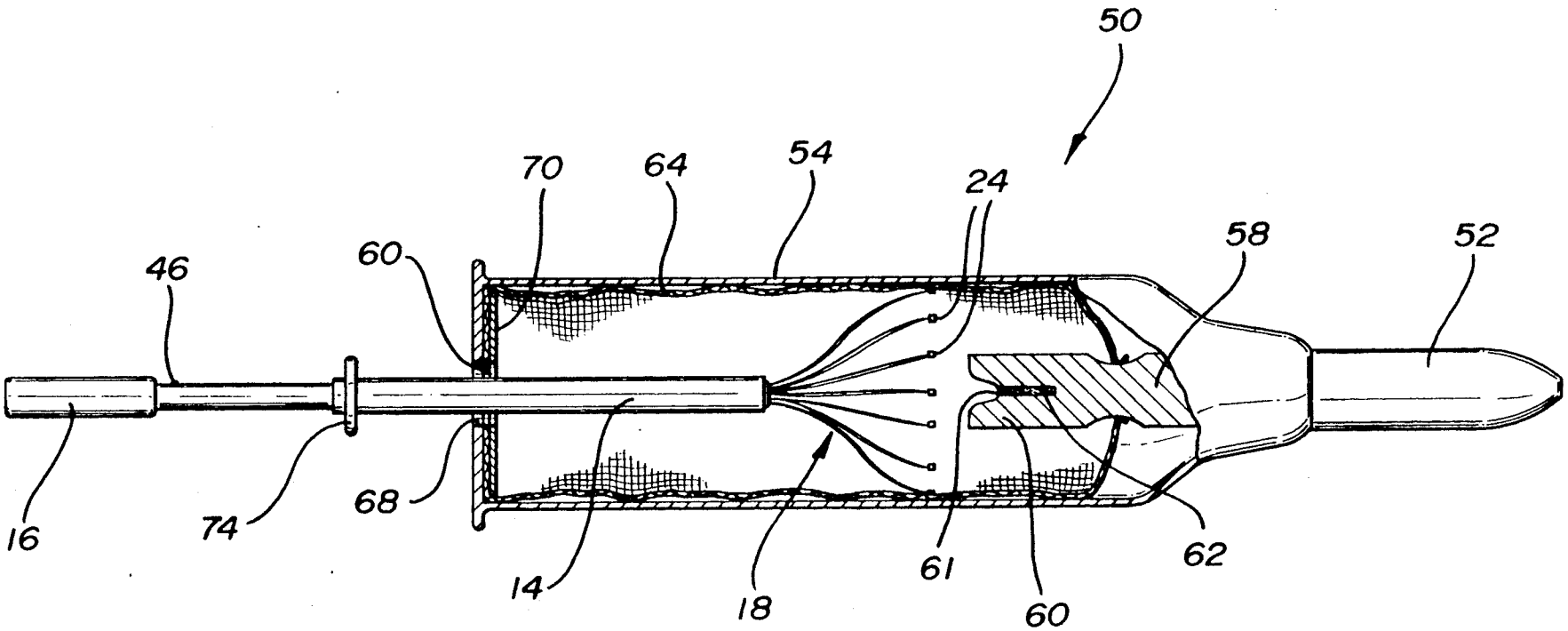
FIG. 4 is a side view of the present invention containment bag blousing tool shown in conjunction with a partially fragmented ammunition cartridge to facilitate consideration and discussion.

Referring now to FIG. 4 in combination with FIGS. 1-3, the operation of the present invention blousing tool 10 is detailed. In a 120 mm cannon round 50, there exists a projectile 52 held in place by a cartridge case 54 which is made from a nitro-cellulose material. The tail end 5 of the projectile 52 extends into the cartridge case 54 and may include stabilizer fins 60 to increase the flight performance of the projectile 52. The center of the stabilizer fins 60 may include an amount of a tracer compound 62 that ignites when the round is fired.

Tied around the projectile 52 within the cartridge case 54 is a propellant containment bag 64, so that the stabilizer fins 60 of the projectile 52 extend into the containment bag 64. The opposing side of the containment bag 64 has a fill orifice 66 formed through it that corresponds in position to the primer hole 68 of the 120 mm round 50. The fill orifice 66 of the containment bag 64 is held in position against the primer hole 68 by a metal plate 70 or other means well known in the art of munitions. During the manufacture of the 120 mm round 50, approximately eight kilograms of explosive propellant (not shown) are introduced into the containment bag 64 through the primer hole 68. The explosive propellant fills the entire containment bag 64 surrounding the stabilizer fins 60 of the projectile 52. Often the containment bag 64 buckles or folds inside the cartridge case 54. The buckles and folds prevent the explosive propellant from fully filling the containment bag 64 and dispersing evenly around the stabilizer fins 60 of the projectile 52.

The present invention containment bag blousing tool 10 is used to remove buckles and folds in the containment bag 64, prior to the filling of the containment bag 64 with explosive propellant. The containment bag blousing tool 10 is manipulated so that the flexible fingers 18 are fully retracted into the tubular sheath 14. The sheath 14 is then inserted into the containment bag 64, within the cartridge case, through the primer hole 68. Once the sheath 14 has cleared the primer hole 68, the shaft 12 can be thrust forward and the flexible fingers 18 deployed. The maximum diameter "d" of the reach of the flexible fingers 18 is greater than the inside diameter of the cartridge case 54. As such, when the flexible fingers 18 are fully expanded within the cartridge case 54, the ends of the flexible fingers 18 are deformed, by the cartridge case 54, into running substantially parallel with the inside surface of the cartridge case 54. The deformation of the flexible fingers 18 by the cartridge case 54 is elastic, therefore the flexible fingers 1 are spring biased against the cartridge case 54.

Positioned between the flexible fingers 18 and the cartridge case 54 is the containment bag 64. Consequently, when the flexible fingers 18 are advanced in the cartridge case 54, the containment bag 64 is pulled taut from the metal plate 70, at the back of the cartridge case 54, to the point of the flexible fingers 18. The pulling taut of the containment bag 64 eliminates any folds or buckling that may have been present in the material of the containment bag 64.

Obviously, since the stabilizer fins 60 of the projectile 52 extend into the containment bag 64, the stabilizer fins 60 cause an obstruction to the advancement of the containment bag blousing tool 10. The length and curvature of the spring wires 20 that construct the flexible fingers 18 are formed to compensate for the obstruction of the stabilizer fins 60. The radial deposition of the flexible fingers 18 from the shaft 12 are arcuately spaced so as to fit between the stabilizer fins. Similarly, the radii of curvature R1, R2 formed into each spring wire 20 is custom constructed for differing projectiles such that the flexible fingers 18 will fit around the tail end of a projectile in any application.

The length of the tubular sheath 14 surrounding the shaft 12 is also custom constructed for various applications. Positioned on the exterior of the sheath 14 is an annular flange 74. The annular flange 74 is so positioned such that the flange 74 contacts the outside of the primer hole 68 at the same instant, or before, the shaft 12 contacts the projectile 52. The positioning of the annular flange 74 in this manner ensures that the containment bag blousing too cannot damage the projectile 52.

When the present invention containment ba blousing tool 10 is inserted into primer hole 68 of the 120mm round, the operator of the tool 10 cannot see the placement of the flexible fingers 18. If the flexible fingers 18 are not fully extended, it is possible that the flexible fingers 18 may contact the projectile 52 in the area of the tracer material 62. The blunt stops 24 at the ends of the flexible fingers 18 have a girth "g" that is larger than the orifice 61 through which the tracer material 62 is exposed. As such, the blunt stops 24 prevent the flexible fingers 18 from contacting and igniting the tracer material 62. The blunt stops 24 also prevent the flexible fingers 18 from rupturing the material of the containment bag 64.

The flexible fingers 18 of the present invention are subject to many repeated stresses that may eventually lead to fatigue failure. Consequently, each flexible finger 18 is formed from a plurality of spring wires 20. The plurality of spring wires 20 are attached at the blunt stops 24. In this manner, if one spring wire breaks, it will be carried back out of the containment bag 54 by the other spring wires. If only one spring wire were used, the breakage of that wire would leave the broken piece in the containment bag 54. Such a broken piece can cause a misfire of the round or may cause a jam in the cannon when the spent cartridge case is ejected.

It will be understood that the embodiment used to illustrate the present invention is merely exemplary and that a person skilled in the art may apply the present invention to many applications without departing from the spirit and scope of the invention. More specifically, it should be recognized that the description of a 120 mm round was purely exemplary and the present invention could be used on any size round containing a propellant containment bag. It should be further understood that a person skilled in the art may make variations and modifications to the exemplary embodiment without departing from the spirit and scope of the invention. All such variations and modifications are intended to be included within the scope of the invention as defined by the appended claims.

What is claimed is:

1. A handtool comprising:

an elongated member having a plurality of flexible fingers extending from one end, each of said flexible fingers being spring biased so as to diverge away from the longitudinal axis of said elongated member, each of said flexible fingers terminating in an enlarged blunt point; and a retracting means for retracting said flexible fingers toward said longitudinal axis.

2. The tool of claim 1, wherein each of said flexible fingers comprised of a plurality of spring wires that converge toward, and are attached to, said enlarged blunt point.

3. The tool of claim 2, wherein said retracting means includes a substantially tubular member positioned around a length of said elongated member so as to be axially and reciprocally movable relative said elongated member, said tubular member contacting said flexible fingers, as said tubular member is advanced against said flexible fingers, the contact of said tubular member against said flexible fingers overcoming the spring bias of said flexible fingers retracting said flexible fingers into said tubular member.

4. The tool of claim 3, wherein the end of said elongated member, opposite said flexible fingers, terminates in a handle means.

5. The tool of claim 3. further including a locking means for temporarily joining said tubular member to said elongated member, preventing the relative movement therebetween.

6. The tool of claim 2, wherein a mechanical fastener attaches said flexible fingers to said elongated member.

7. In an ammunition cartridge having an inner chamber accessible through a primer aperture and in which the tail end of a projectile contacts a volume of propellant material, both the tail end of the projectile and the propellant material being enclosed within a containment bag that is also accessible through the primer aperture, a tool for removing folds and buckles in the containment bag without damaging the projectile, prior to the addition of a propellant material into the containment bag, said tool comprising:

an elongated member including a plurality of retractable flexible fingers extending from one end, each of said flexible fingers being spring biased so as to diverge away from the longitudinal axis of said elongated member, each said flexible finger terminating in an enlarged blunt point, and a retraction means for retracting said flexible fingers toward said longitudinal axis.

8. The tool of claim 7, wherein said flexible fingers are spring biased to diverge in an arcuate pattern to a diameter that is greater than the diameter of said inner chamber of said ammunition cartridge.

9. The tool of claim 8, wherein said retraction means retracts said flexible fingers to a diameter smaller than the diameter of said primer aperture.

10. The tool of claim 9, wherein each said flexible finger comprises a plurality of spring wires that converge and are joined at said enlarged blunt point.

11. The tool of claim 10, wherein each said enlarged blunt point is fabricated so as to be incapable of entering an orifice formed on said tail end of said projectile through which an amount of tracer material is exposed.

12. The tool of claim 10, wherein said retracting means includes a substantially tubular member positioned around a length of an elongated shaft so as to be axially and reciprocally movable relative to said elongated shaft, said flexible fingers depending from said elongated shaft such that the advancement of said tubular member against said flexible fingers overcomes the spring bias of said flexible fingers retracting said flexible fingers into said tubular member.

13. The tool of claim 12, wherein said tubular member has an annular flange radially disposed on its outer surface, said annular flange being larger than said primer aperture preventing the passage of said annular flange through said primer aperture.

14. The tool of claim 12, wherein the end of said elongated shaft opposite said flexible fingers, terminates in a handle means.

15. The tool of claim 14, wherein said flexible fingers are formed to extend around said tail end of said projectile to the end of said containment bag without contacting said tail end of said projectile.

16. The tool of claim 12, further including a locking means for temporarily joining said tubular member to said elongated shaft preventing the relative movement therebetween.

17. In an ammunition cartridge having an inner chamber accessible through a primer aperture and in which the tail end of a projectile contacts a volume of propellant material, both the tail end of the projectile and the propellant material being enclosed within a containment bag that is also accessible through the primer aperture, a method for removing folds and buckles in the containment bag prior to the introduction of propellant material utilizing a tool that has a plurality of retractable flexible fingers depending from one end thereof; said method including the steps of:

inserting said flexible fingers of said tool into said containment bag through said primer aperture;

expanding said flexible fingers such that said flexible fingers press said containment bag against said inner chamber;

advancing said flexible fingers toward a back end of said containment bag, opposite said primer aperture;

retracting said flexible fingers into said tool; and removing said tool from said cartridge.

18. The method of claim 17, further comprising the step of preventing said flexible fingers from being advanced beyond said back end of said containment bag.

19. The method of claim 17, wherein each said flexible fingers is formed from a plurality of spring wires.

20. The method of claim 19, wherein said plurality of spring wires terminate, and are joined together, at a blunt point.

* * * * *